United States Patent [19]

Fehrenbach et al.

[11] Patent Number: 5,148,341

[45] Date of Patent: Sep. 15, 1992

[54] READ-WRITE DEVICE FOR DATA PROCESSING WITH MAGNETIC INFORMATION CARRIERS

[75] Inventors: Christian Fehrenbach, Schonach; Günter Ketterer, Unterkirach; Wolfgang Schlassus, VS-Villingen, all of Fed. Rep. of Germany

[73] Assignee: Mannesmann Aktiengesellschaft, Düsseldorf, Fed. Rep. of Germany

[21] Appl. No.: 276,056

[22] Filed: Nov. 25, 1988

[30] Foreign Application Priority Data

Nov. 24, 1987 [EP] European Pat. Off. ........ 87730156.4

[51] Int. Cl.⁵ .......................... G11B 5/55; G11B 21/10
[52] U.S. Cl. .................................................... 360/106
[58] Field of Search ............... 360/106, 101, 2, 104, 360/109, 88

[56] References Cited

U.S. PATENT DOCUMENTS

| | | | |
|---|---|---|---|
| 3,822,376 | 7/1974 | Kok et al. | 255/61 |
| 3,969,768 | 7/1976 | Ebbing | 360/106 |
| 4,040,097 | 8/1977 | Mizuno | 360/2 |
| 4,071,866 | 1/1978 | Butsch | 360/106 |
| 4,110,803 | 8/1978 | Townsend | 360/2 |
| 4,375,071 | 2/1983 | Crowley et al. | 360/104 |
| 4,538,191 | 8/1985 | Suzuki et al. | 360/88 |
| 4,646,181 | 2/1987 | Morigaki | 360/104 |
| 4,647,998 | 3/1987 | Onohara et al. | 360/104 |
| 4,700,251 | 10/1987 | Fuke et al. | 360/106 |
| 4,747,004 | 5/1988 | Kukreja et al. | 360/106 |
| 4,750,068 | 6/1988 | Akasaki et al. | 360/106 |

FOREIGN PATENT DOCUMENTS

| | | |
|---|---|---|
| 0087997 | 2/1983 | European Pat. Off. . |
| 0125655 | 11/1984 | European Pat. Off. . |
| 59-103333 | 2/1985 | Japan . |
| 59-103947 | 7/1985 | Japan . |
| 58-246786 | 7/1985 | Japan . |
| 58-248430 | 7/1985 | Japan . |
| 58-250832 | 7/1985 | Japan . |
| 59-105140 | 12/1985 | Japan . |

*Primary Examiner*—Robert S. Tupper
*Attorney, Agent, or Firm*—Horst M. Kasper

[57] ABSTRACT

A device for the data processing with magnetic information carriers (2) includes a read-write head (4), where a relative motion occurs between the information carrier and the read-write head (4) during processing by driving a slide (5) with a motor (6). In order to avoid distortion generated by mechanical errors of the device during reading of the data, it is disclosed that the drive connection between the slide (5) and the motor (6) is free from play in axial direction and that the read-write head (4) is springingly adjustable with a holder (14), free from play in axial direction and perpendicular to the surface (2a) of the information carrier.

32 Claims, 5 Drawing Sheets

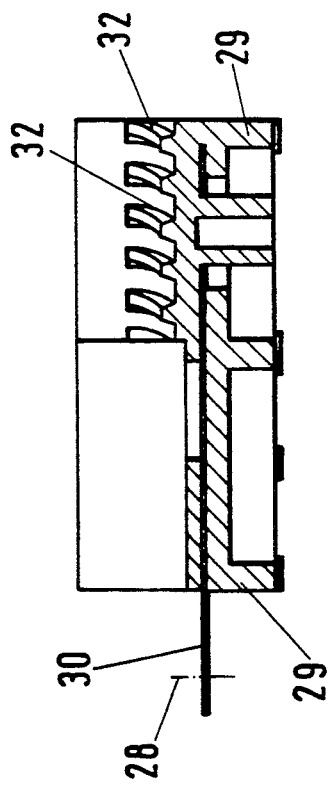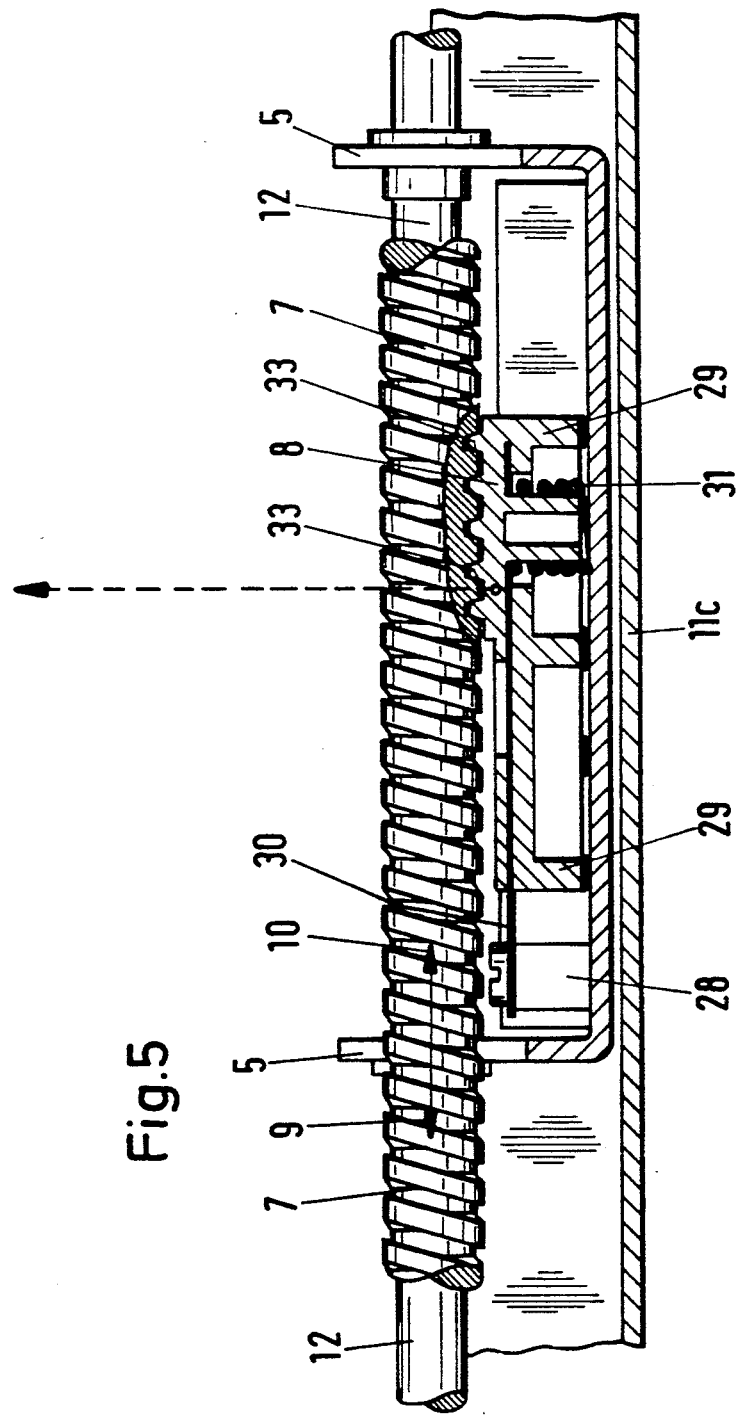

READ-WRITE DEVICE FOR DATA PROCESSING WITH MAGNETIC INFORMATION CARRIERS

BACKGROUND OF THE INVENTION

1. Field of the Invention

The invention relates to a device for data processing with magnetic information carriers, with a read-write head, where a relative motion is occurring between the information carrier and the read-write head during processing and where a slide can be driven by a motor.

2. Brief Description of the Background of the Invention Including Prior Art

Conventional magnet strip module device groups include a slide which is driven with a screw spindle and a motor. Instead of the element of a screw spindle, there can be employed in certain circumstances a Bowden control or a cable pull. The support of the screw spindle relative to the apparatus frame is presently not free from play and thus the motion of the read-write head cannot occur at constant speed. In such a case, the magnetic recordings, such as bits, move relative to each other such that an information distortion and corruption occurs. In one case, a distorted recording is generated and, in a second case, it is not possible to read free from errors. It is to be considered here, that the information density, according to accepted standards, is prescribed by a distance from bit to bit of 0.06 mm. The tolerance amounts during writing in this case, for example, to + 5% of 0.06 mm. Such devices therefore require an extremely high accuracy of the motion for a slide driven by a motor.

SUMMARY OF THE INVENTION

Purposes of the Invention

It is an object of the present invention to provide a device for data processing with magnetic information carriers, where a recording is obtained free from errors and where undistorted data can be read accurately.

It is yet another object to provide a device which achieves a higher level of magnetic recording and reading accuracy.

It is yet a further objecct of the present invention to provide a method which allows to accomplish safe and reliable reading of magnetic carriers.

These and other objects and advantages of the present invention will become evident from the description which follows.

Brief Description of the Invention

The present invention provides for a data processing device using a magnetic information carrier. A read-write head operates under a relative motion occurring between the information carrier and the read-write head during processing. A drive connection is attached to a slide. A motor is connected to the slide by the drive connection and drives the slide. The drive connection between the slide and the motor is free from play in the direction of the slide motion. The read-write head is springingly settable, free from play, also in a direction of motion perpendicular to a surface of the information carrier.

A holder can be mounted to the slide and can springingly support the read-write head disposed on the slide. Said holder can comprise two spring supported bearing guides disposed at a distance from each other in the directions of motion of the slide. The bearing guides can be springing in a direction perpendicular to the directions of motion of the slide. Spring supported bearing guides can tiltably support the holder in a plane perpendicular to the information carrier surface at the spring supported bearing guides. A bearing cup can be disposed in the spring supported bearing guide in each case. A rigid bearing pin can be attached in the middle of the bearing cup. A compression spring can rest on a base in the bearing cup. A bearing bush can be guided on the bearing pin and wherein the compression spring can be supported by the bearing bush. A separable ball bearing can be mounted on a frame. A movable bearing can be attached to the motor. A screw spindle can be connected to the motor and can drive the slide. The screw spindle can be supported free from play in a direction of motion of the slide in the frame by way of the separable ball bearing and on the motor side with the movable bearing. A collar can be furnished at the screw spindle and at a shaft of the motor. An axial spring can be inserted between the collar at the screw spindle and the collar at the motor shaft. A spindle nut can have a thread with first flanks, where said first flanks of the thread can rest radially springingly against second flanks of a thread of the screw spindle, and where the screw spindle can be supported in the spindle nut.

Two side platens together with bridge pieces can form a frame and said frame can support the motor. Guide rods can be supported in the frame for supporting in turn the slide in a direction parallel to the motion direction of the slide.

According to the present invention, the drive connection between the slide and the motor is free from play in axial direction and the read-write head is also free from play in axial direction of motion and the read-write head is springingly adjustable perpendicular to the information carrier surface. Such construction has a dual function: The required accuracy during reading or, respectively, writing of the data is maintained and, in addition, positions of the information carrier, unavoidably deviating from their theoretical location, are simultaneously captured.

According to further features it is provided that the read-write head is disposed on the slide and is spring supported at the holder, where the holder comprises spring supported bearing guides disposed perpendicular to the directions of motion and disposed at a distance relative to each other in the axial directions of motion. Such a holder can be connected free from play with the slide based on the initially disclosed freedom from play in axial direction of motion. Nevertheless, adaptation motions at the non-planar information carrier can be performed in cross direction.

This concept is further developed for theoretically wavy and threaded information carriers by providing that the holder is tiltably supported at the spring supported bearing guides in a plane perpendicular to the information carrier surface. Thereby, no restoring forces act on the holder, i.e. the position of the holder is stable at every moment.

A feature of the present invention comprises that the spring supported bearing guide, in each case, comprises a bearing cup and a rigid bearing pin attached in the middle as well as a compression spring, resting at the base of the bearing cup, and a bearing bush guided on the bearing pin, where the compression spring is supported against the bearing bush. Such an embodiment of the invention is associated with a particularly low weight and fulfils all required functions.

It is disclosed that the slide is drivable with a screw spindle, which is supported in the frame, in an axial direction and free from play, by way of a detachable ball joint bearing or a separable ball bearing, and on the side of the motor with a movable bearing or a floating type bearing, for providing the drive connection between slide and motor, which drive connection has to be free from play. An axial spring is positioned between the screw spindle collar and the motor shaft collar. The latter axial spring prevents any play in axial direction and, in fact, advantageously both in one as well as in the second direction of motion. In no case do forces act on the motor support. The axial forces are received by the motor case.

The invention includes further the feature that the screw spindle is supported in a spindle nut, which rests with its flanks of the screw thread radially against the second flanks of the thread of the screw spindle. This solution operates in principle like a toothed rack where, however, the difference of the rotational motion of the screw spindle is superposed. Therefore, it is not required that the spindle nut rests on the full circumference of the screw spindle.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 5 is a section of FIG. 2 in a partial cross-section with the screw spindle and the spindle nut, again in enlarged representation, and FIG. 6 is a longitudinal section through the device group of the spindle nut.

DESCRIPTION OF INVENTION AND PREFERRED EMBODIMENT

Figure 1:
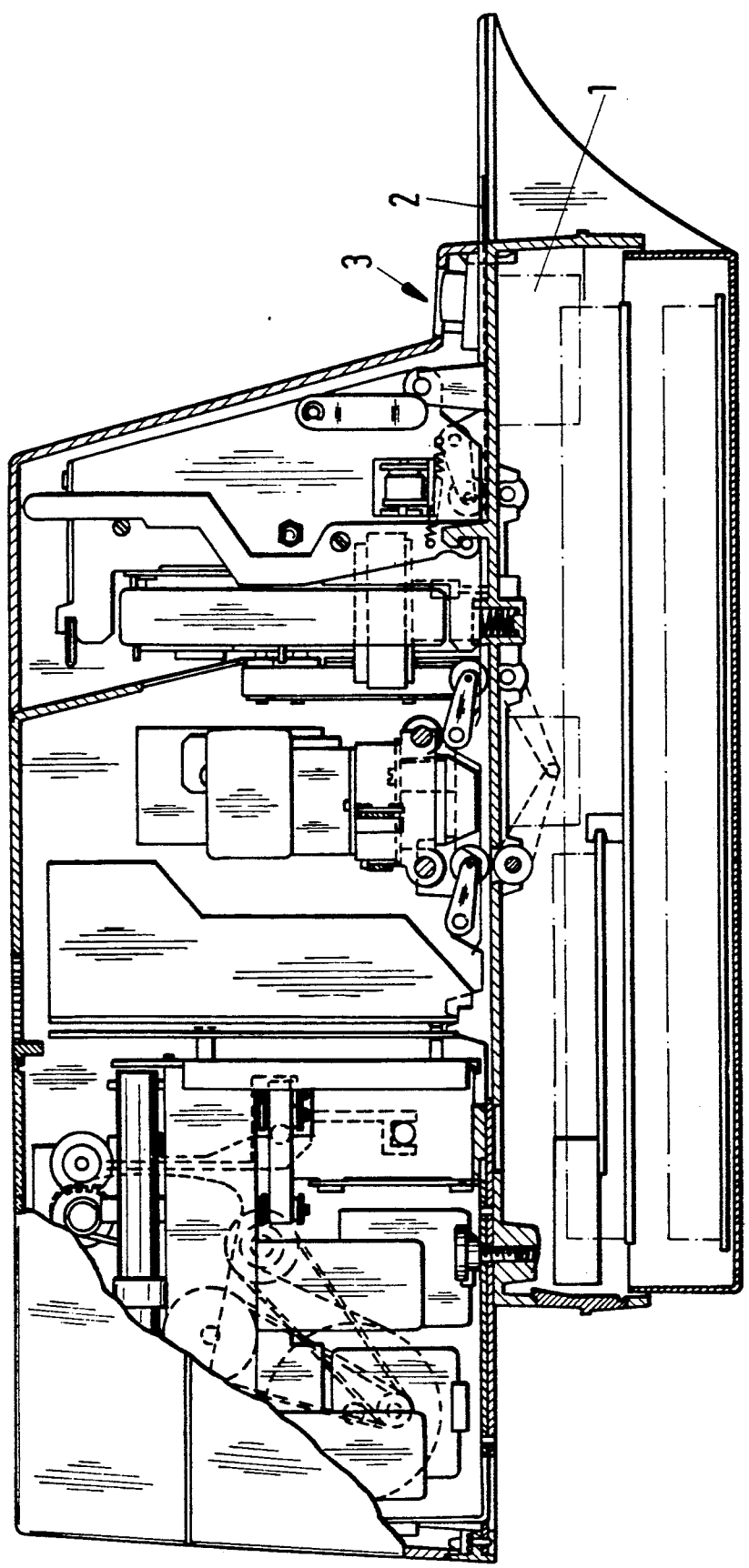
FIG. 1 is a longitudinal sectional view through a multiform printer with the device for the magnet strip processing.

In accordance with the present invention, there is provided a device 1 for data processing with magnetic information carriers 2, with a read-write head 4. A a relative motion occurs between the information carrier 2 and the read-write head 4 during processing. A slide 5 is driven by a motor 6. The drive connection between the slide 5 and the motor 6 is free from play in axial direction. The read-write head 4 is springingly settable, free from play, also in the axial direction of motion and perpendicular to the surface 2a of the information carrier.

Figure 2:
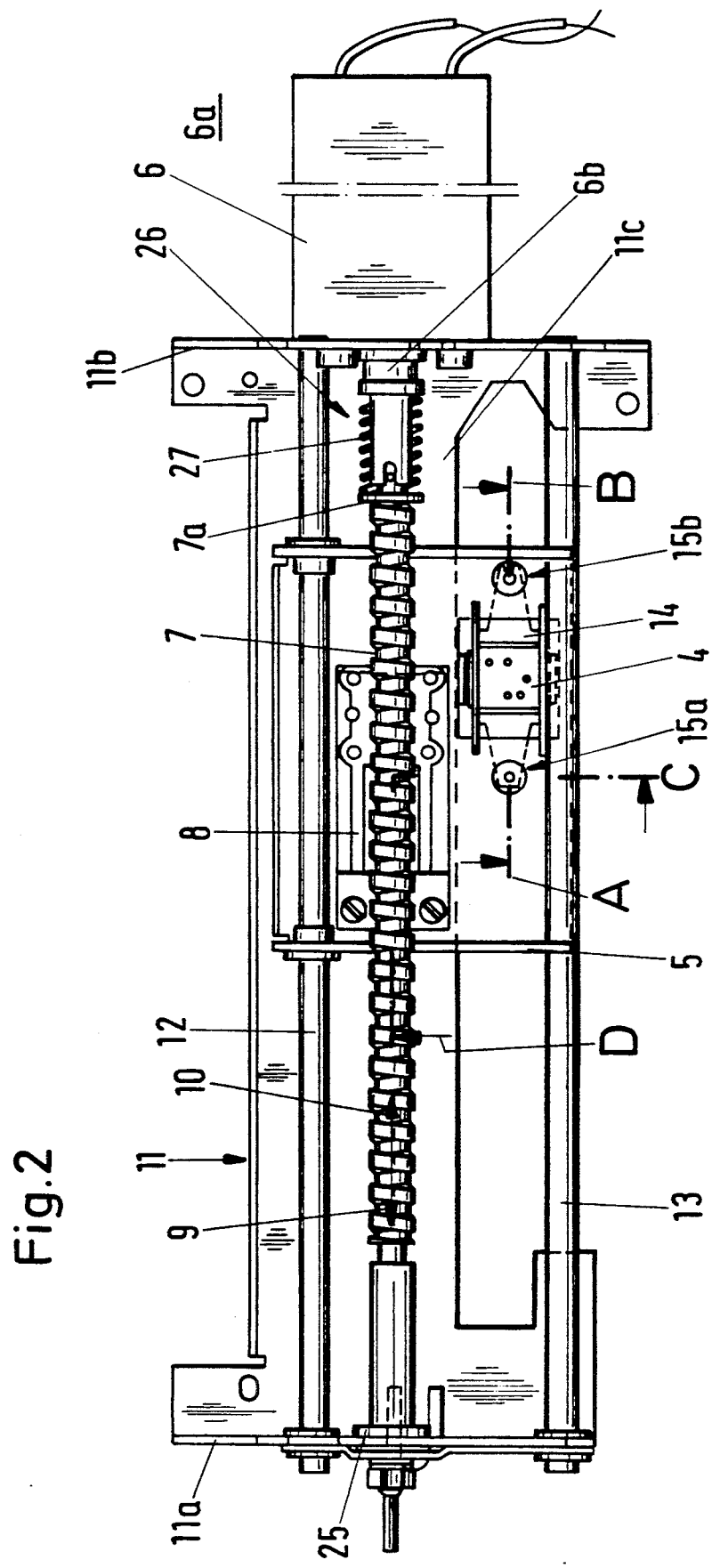
FIG. 2 is a bottom view unto the device for the magnet strip processing.
Figure 3:
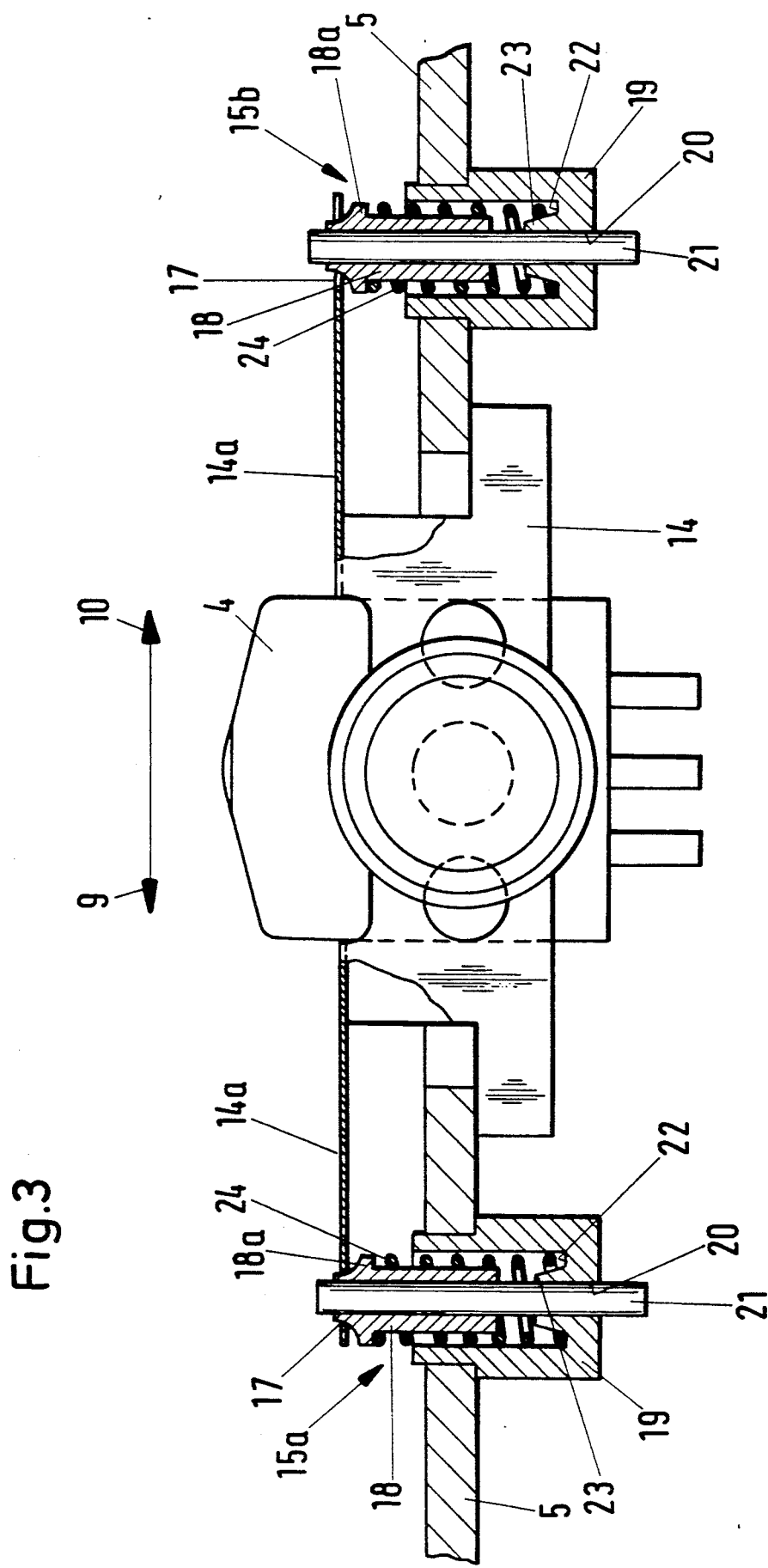
FIG. 3 is cross section A-B of a section in FIG. 2 and presents a substantially enlarged representation seen from the side.

A device 1 for the data processing with a magnetic information carrier 2 is employed, for example, in a multiform printer 3 illustrated in FIG. 1. The device 1 visible in FIG. 1 from the side is, illustrated in FIG. 2 from below, and in FIG. 3 from the side in a more comprising way, and includes a read-write head 4 (FIG. 3). A relative motion occurs between the information carrier 2, which comprises for example a magnet strip which can be magnetized, and the read-write head 4. Either a slide 5 is moved together with the information carrier 2 under the read-write head 4, or the read-write head 4 (as illustrated here in FIG. 2) is moved back and forth during the processing over the locally fixed information carrier 2. In this latter case, the slide 5 is driven by a motor 6. The motor 6 transfers the rotary driving force via a screw spindle 7, where the play of the thread of the screw spindle is balanced in a corresponding spindle nut 8. The drive connection between the slide 5 and the motor 6 is therefore axial, i.e. in the directions of motion 9 and 10 and free from play even in case of a reversed motion as will be illustrated and described in more detail.

The motor 6 is supported at a frame 11 which frame comprises two side platens 11a and 11b as well as a bridge piece 11c. In addition, guide rods 12 and 13 are supported in the frame 11 and the guide rods 12 and 13 guide the slide 5 in a direction parallel to the directions of motion 9 and 10.

Figure 4:
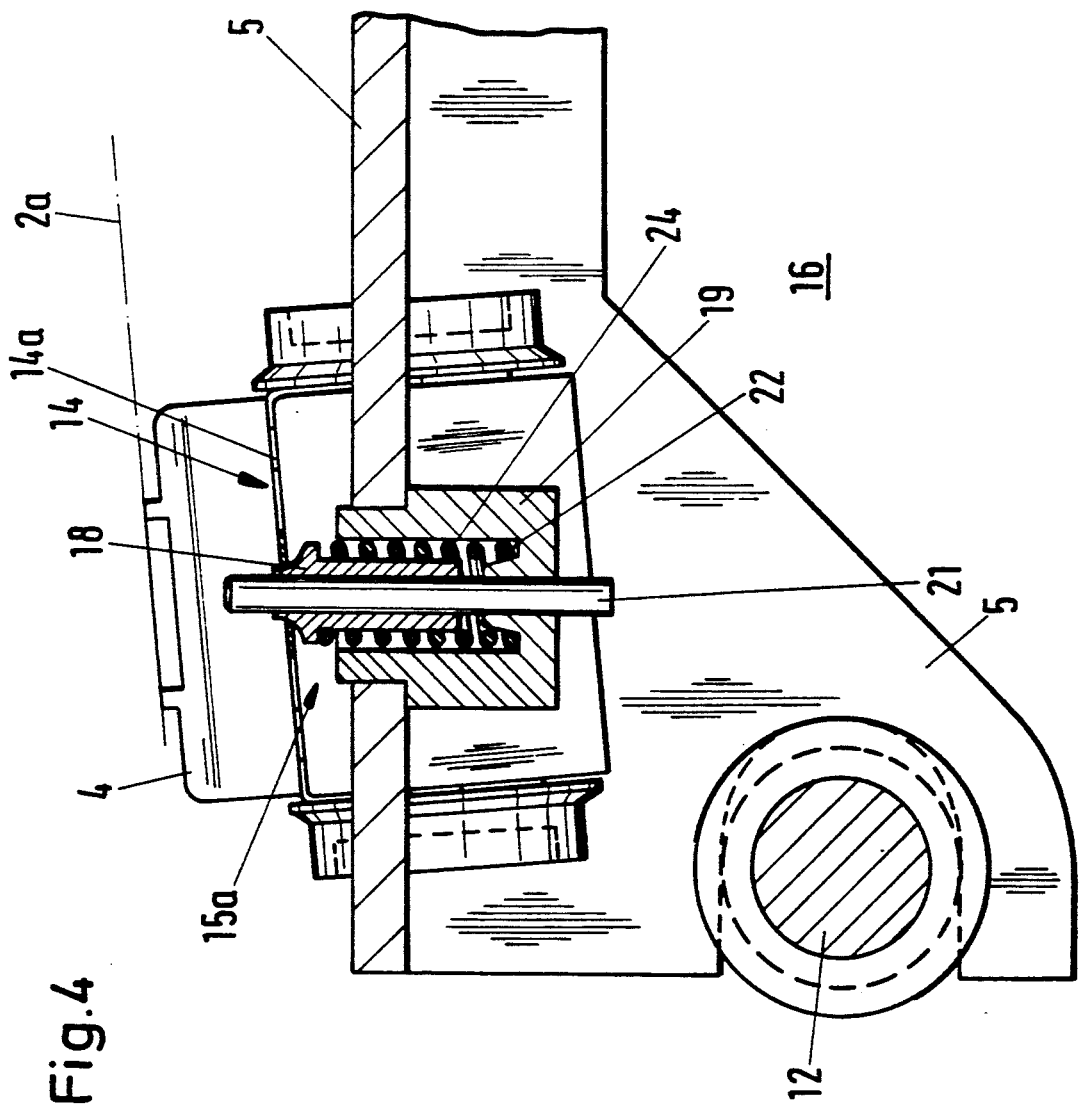
FIG. 4 is a partial, sectional view C-D according to the section indication in FIG. 2 and in accordingly increased scale.

The read-write head 4 is attached with a holder 14 in the slide 5. The attachment of the holder 14 is also free from play in an axial direction of motion 9, 10, even though the holder 14 and thus the read-write head 4, is springingly adjustable in a direction perpendicular to the surface 2a of the information carrier, as seen in FIG. 4, in order to assure a nearly air-gap-free sliding of the read-write head 4 on the information carrier surface 2a.

According to an embodiment illustrated in FIG. 3, the read-write head 4 is springingly supported on the slide 5 at the holder 14. For this purpose, the holder 14 comprises at least two springing bearing supports 15a and 15b, disposed at a distance from each other and perpendicular to the directions of motion 9 or, respectively 10, and directed in the axial directions of motion 9, 10 of the slide 5. The holder 14 is tiltably supported at the springing bearing supports 15a and 15b in a great plane 16, running vertical on the drawing plane of FIG. 3, which plane 16 is disposed in the drawing plane of FIG. 4, and which plane 16 runs vertical on the information carrier surface 2a.

The holder 14 forms attachment eyes 17 at extensions 14a. The attachment eyes 17 are in each case hung on bearing bushes 18 and in fact such that no axial play is generated in the directions of motion 9 or, respectively, 10. In addition, bearing cups 19 are pressed at a distance into the slide 5 at an axial distance, i.e. having a distance in the directions of motion 9 or, respectively, 10, and bearing pins 21 are fixedly pressed into the middle bores 20 of the bearing cups 19. In each case, a guide cone 23 is formed in a bearing cup base 22. In each case, a compression spring 24 is supported on the guide cone 23. The compression spring 24 rests at its opposite ends at a collar 18a. The read-write head 4 thus follows each unevenness, each inclined position or the like, of the information carrier 2, as illustrated in FIG. 4. In this case, no restoring forces act on the read-write head 4, i.e. the position of the read-write head 4 is stable at every moment.

The drive connection free from play, between the slide 5 and the motor 6 or, respectively, the screw spindle 7, results initially from a separable ball joint bearing or separable ball bearing 25, which serves as a fixed bearing support. Furthermore, a movable bearing or a floating bearing 26 is formed on the motor side 6a, which movable bearing or floatable bearing 26 comprises essentially an axial spring 27 supported against the motor shaft collar 6b. The axial spring 27 is supported against a screw spindle collar 7a. The axial spring 27 consequently presses the screw spindle 7 continuously against the detachable ball joint bearing or separable ball bearing 25 or, respectively, against the motor casing. However, no forces act against the motor support since these forces are accepted by the motor casing.

The axial play now still occurring between the screw spindle 7 and the spindle nut 8, possibly generated by wear, is eliminated as follows: A stud bolt 28 is mounted to the slide 5, which slide 5 is slidingly supported on the guide rods 12 and 13. A spindle nut holding fixture 29 is attached to the stud bolt 28. The spindle nut holding fixture 29 can, as illustrated, be provided as a single part with the spindle nut 8. The spindle nut holding fixture 29 is furthermore attached with a springing arm 30 at the stud bolt 28 (FIG. 6). The arm 30 is pressed together with the spindle nut 8 by way of a compression spring 31 (FIG. 5) based on forces defined by the spring characteristic of the compression spring 31 as well as by the length of the arm 30, as well as based on the number of the pitches of the thread of the spindle nut 8, with the first flanks of the thread 32 of the spindle nut 8, into the second flanks of the thread 33 of the screw spindle 7. The first flanks of the thread 32 and the second flanks of the thread 33 are advantageously selected to be trapezoidal threads and the positioning of the flanks of the thread 32 or, respectively, 33 against each other is therefore possible, because the crest of thread of the spindle nut 8 cannot touch the thread base of the screw spindle 7. Advantageously, the spindle nut 8 can further be formed from two halves, which are connected to each other by way of screws.

The spindle nut 8 exhibits, in this case, a threaded section only on the motor side 6a, where also only the thread comes to engage on the lower circumferential region, shown in FIG. 5, of the screw spindle 7, shown in FIG. 6.

It will be understood that each of the elements described above, or two or more together, may also find a useful application in other types of data processing devices differing from the types described above.

While the invention has been illustrated and described as embodied in the context of a data processing device using a magnetic information carrier, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A data processing device using a magnetic information carrier comprising
   a read-write head operating under a relative motion occurring between the informaiton carrier and the read-write head during processing;
   a slide;
   a drive connection attached to the slide;
   a motor connected to the slide by the drive connection and driving the slide, where the drive connection between the slide and the motor is tightly engaging in the direction of the slide motion and where the read-write head is settable to a precise position with resilient restoring forces maintaining such position in a direction of motion perpendicular to a surface of the information carrier;
   a holder mounted to the slide and including resilient means supporting the read-write head disposed on the slide; said holder comprising
   two spring supported bearing guides disposed on the holder at a distance from each other in the directions of motion of the slide, where the bearing guides are springing in a direction perpendicular to the directions of motion of the slide;
   wherein the spring supported bearing guides are tiltably supporting the holder in a plane perpendicular to the information carrier surface at the spring supported bearing guides;
   a bearing cup disposed in the spring supported bearing guide in each case;
   a rigid bearing pin attached in the middle of the bearing cup;
   a compression spring resting on a base in the bearing cup; a bearing bush guided on the bearing pin and wherein the compression spring is supported by the bearing bush.

2. The data processing device according to claim 1 further comprising
   two bridges pieces;
   two side platens together with the bridge pieces forming a frame, where the frame supports the motor;
   guide rods supported in the frame for supporting in turn the slide in a direction parallel to the motion direction of the slide.

3. The data processing device according to claim 1 wherein
   the drive connection free from play, between the slide and the motor and the screw spindle, includes a separable ball bearing, where the separable ball bearing serves as a fixed bearing support, and wherein, a movable bearing is formed on the motor side,
   where the movable bearing comprises an axial spring supported against a motor shaft collar, wherein the axial spring is supported against a screw spindle collar, and wherein the axial spring consequently presses the screw spindle continuously against the separable ball bearing and against a motor casing.

4. The data processing device according to claim 1 further comprising
   a stud bolt mounted to the slide, wherein any axial play between the screw spindle and a spindle nut, generated by wear, is eliminated by the mounted stud bolt and wherein the slide is slidingly supported on guide rods, and
   a spindle not holding fixture attached to the stud bolt.

5. The data processing device according to claim 4, wherein the spindle nut holding fixture including a springing arm is furthermore attached with the springing arm at the stud bolt, and wherein the springing arm is pressed together with the spindle nut by way of a compression spring, based on forces defined by the spring characteristic of the compression spring, by the length of the springing arm, and by the number of the pitches of a thread of the spindle nut, and wherein first flanks of the thread of the spindle nut, engage into second flanks of the thread of the screw spindle.

6. The data processing device according to claim 5, wherein
the first flanks of the thread and the second flanks of the thread are trapezoidal threads, and wherein the crest of the thread of the spindle nut does not touch the thread base of the screw spindle for positioning of the flanks of the threads against each other.

7. The data processing device according to claim 4, wherein
the spindle nut holding fixture can be provided as a single part with the spindle nut.

8. The data processing device according to claim 4, wherein
the spindle nut is formed of two halves, which halves are connected to each other by way of screws.

9. The data processing device according to claim 4, wherein
the spindle nut exhibits a threaded section only on the motor side and wherein only the thread comes to engage on the lower circumferential region of the screw spindle.

10. The data processing device according to claim 1 further comprising
a frame;
a separable ball bearing mounted on the frame;
a movable bearing attached to the motor;
a screw spindle connected to the motor and driving the slide, where the screw spindle is supported in a precise defined position in a direction of motion of the slide in the frame by way of the separable ball bearing and on the motor side with the movable bearing;
a collar furnished at the screw spindle;
a collar furnished at a shaft of the motor;
an axial spring inserted between the collar at the screw spindle and the collar at the motor shaft.

11. The data processing device according to claim 10 further comprising
a spindle nut having a thread with first flanks, where said first flanks of the thread rest radially springingly against second flanks of a thread of the screw spindle, and wherein the screw spindle is supported in the spindle nut.

12. A data processing device using a magnetic information carrier comprising
a read-write head operating under a relative motion occurring between the information carrier and the read-write head during processing;
a slide;
a drive connection attached to the slide;
a motor connected to the slide by the drive connection and driving the slide, where the drive connection between the slide and the motor is tightly engaging in the direction of the slide motion and where the read-write head is settable to a precise position with resilient restoring forces maintaining such position in a direction of motion perpendicular to a surface of the information carrier; a holder mounted to the slide and springingly supporting the read-write head disposed on the slide; said holder comprising
two spring supported bearing guides disposed at a distance from each other in the directions of motion of the slide, where the bearing guides are springing in a direction perpendicular to the directions of motion of the slide; spring supported bearing guides tiltably supporting the holder in a plane perpendicular to the information carrier surface at the spring supported bearing guides;
a bearing cup disposed in the spring supported bearing guide in each case;
a rigid bearing pin attached in the middle of the bearing cup;
a compression spring resting on a base in the bearing cup;
a bearing bush guided on the bearing pin, and wherein the compression spring is supported by the bearing bush;
a frame;
a separable ball bearing mounted on the frame;
a movable bearing attached to the motor;
a screw spindle connected to the motor and driving the slide, where the screw spindle is supported for being precisely positioned in a direction of motion of the slide in the frame by way of the separable ball bearing and on the motor side with the movable bearing;
a collar furnished at the screw spindle;
a collar furnished at a shaft of the motor;
an axial spring inserted between the collar at the screw spindle and the collar at the motor shaft;
a spindle nut having a thread with first flanks, where said first flanks of the thread rest radially springingly against second flanks of a thread of the screw spindle, and wherein the screw spindle is supported in the spindle nut.

13. The data processing device according to claim 12 further comprising
a holder mounted to the slide and including resilient means supporting the read-write head disposed on the slide; said holder comprising
two spring supported bearing guides disposed at a distance from each other in the directions of motion of the slide, where the bearing guides are springing in a direction perpendicular to the directions of motion of the slide.

14. The data processing device according to claim 13 wherein the spring supported bearing guides are tiltably supporting the holder in a plane perpendicular to the information carrier surface at the spring supported bearing guides.

15. The data processing device according to claim 12 further comprising
a frame;
a separable ball bearing mounted on the frame;
a movable bearing attached to the motor;
a screw spindle connected to the motor and driving the slide, where the screw spindle is supported in a precise defined position in a direction of motion of the slide in the frame by way of the separable ball bearing and on the motor side with the movable bearing;
a collar furnished at the screw spindle;
a collar furnished at a shaft of the motor;

an axial spring inserted between the collar at the screw spindle and the collar at the motor shaft.

16. The data processing device according to claim 15 further comprising
a spindle nut having a thread with first flanks, where said first flanks of the thread rest radially springingly against second flanks of a thread of the screw spindle, and wherein the screw spindle is supported in the spindle nut.

17. A device (1) for data processing with magnetic information carriers (2), with a read-write head (4), where a relative motion occurs between the information carrier (2) and the read-write head (4) during procesing, and where a slide (5) is driven by a motor (6), where
a drive connection between the slide (5) and the motor (6) is precision positioned in an axial direction of motion and that the read-write head (4) is settable subjected to a spring force and at a precise location relative to the axial direction of motion and perpendicular to the surface (2a) of the information carrier;
wherein the read-write head (4) is disposed on the slide (5) and is springingly supported at a holder (14), where the holder (14) comprises two spring supported bearing guides (15a, 15b), disposed at a distance from each other in the axial directions of motion 9, 10, and springing perpendicular to the directions of motion 9, 10;
wherein the holder (14) is tiltably supported in a plane (16) perpendicualr to the information carrier surface (2a) at the spring supported bearing guides (15a, 15b);
wherein the spring supported bearing guides (15a, 15b), in each case, comprise a bearing cup (19) and a rigid bearing pin (21) attached in the middle, as well as a compression spring (24) resting in the bearing cup base (22), and a bearing bush (18) guided on the bearing pin (21), where the compression spring (24) is supported against the bearing bush (18).

18. Device according to claim 17, further comprising,
a holder (14) comprises two spring supported bearing guides (15a, 15b), disposed at a distance from each other in the axial directions of motion 9, 10, and springing perpendicular to the directions of motion 9, 10, wherein the read-write head (4) is disposed on the slide (5) and is springingly supported at a holder (14).

19. Device according to claim 10, wherein the holder (14) is tiltably supported in a plane (16) perpendicular to the information carrier surface (2a) at the spring supported bearing guides (15a, 15b).

20. Device according to claim 17 wherein the slide (5) is engaged with a screw spindle (7), which is supported for being precisely and reproduceably positioned in axial direction in the frame (11) by way of a separable ball bearing (25), and on the motor side with a movable bearing (26), wherein an axial spring (27) is inserted between a screw spindle collar (7a) and the motor shaft collar (6b).

21. Device according to claim 20 wherein the screw spindle (7) is supported in a spindle nut (8), which spindle nut (8) resets radially springingly with its first flanks of the thread (32) against the second flanks of the thread (33) of the screw spindle (7).

22. A data processing device using a magnetic information carrier comprising
a read-write head;
an information carrier disposed facing the read-write head;
a slide supporting the read-write head;
a drive connection attached to the slide;
a motor connected to the slide by the drive connection and driving the slide for generating a relative motion between the information carrier and the read-write head during processing, wherein the drive connection between the slide and the motor is a precision transmission in the direction of the slide motion and where the read-write head is retained in a precise position by spring forces in a direction of motion perpendicular to a surface of the information carrier;
a holder mounted to the slide and supporting the read-write head in a precise position and subject to a restoring spring disposed on the slide; said holder comprising
two spring supported bearing guides disposed at a distance from each other in the directions of motion of the slide, wherein the bearing guides are springing in a direction perpendicular to the directions of motion of the slide;
wherein the spring supported bearing guides are tiltably supporting the holder in a plane perpendicular to the information carrier surface at the spring supported bearing guides, further comprising
a bearing cup disposed in the respective spring supported bearing guide in each case;
a rigid bearing pin attached in the middle of the bearing cup;
a compression spring resting on a base in the bearing cup;
a bearing bush guided on the bearing pin and wherein the compression spring is supported by the bearing bush.

23. The data processing device according to claim 22 further comprising
a frame;
a separable ball bearing mounted on the frame;
a movable bearing attached to the motor;
a screw spindle connected to the motor and driving the slide, where the screw spindle is supported at a precisely defined position in each case in a direction of motion of the slide in the frame by way of the separable ball bearing and on the motor side with the movable bearing;
a collar furnished at the screw spindle;
a collar furnished at a shaft of the motor;
an axial spring inserted between the collar at the screw spindle and the collar at the motor shaft;
a spindle nut having a thread with first flanks, where said first flanks of the thread rest radially springingly against second flanks of a thread of the screw spindle, and wherein the screw spindle is supported in the spindle nut.

24. The data processing device according to claim 22 further comprising
a holder mounted to the slide and springingly supporting the read-write head disposed on the slide; said holder comprising
two spring supported bearing guides disposed at a distance from each other in the directions of motion of the slide, where the bearing guides are springing in a direction perpendicular to the directions of motion of the slide;
spring supported bearing guides tiltably supporting the holder in a plane perpendicular to the information carrier surface at the spring supported bearing guides;

a bearing cup disposed in the spring supported bearing guide in each case;

a rigid bearing pin attached in the middle of the bearing cup;

a compression spring resting on a base in the bearing cup;

a bearing bush guided on the bearing pin, and wherein the compression spring is supported by the bearing bush;

a frame;

a separable ball bearing mounted on the frame;

a movable bearing attached to the motor;

a screw spindle connected to the motor and driving the slide, where the screw spindle is supported free from play in a direction of motion of the slide in the frame by way of the separable ball bearing and on the motor side with the movable bearing;

a collar furnished at the screw spindle;

a collar furnished at a shaft of the motor;

an axial spring inserted between the collar at the screw spindle and the collar at the motor shaft;

a spindle nut having a thread with first flanks, where said first flanks of the thread rest radially springingly against second flanks of a thread of the screw spindle, and wherein the screw spindle is supported in the spindle nut;

two bridges pieces;

two side platens together with the bridge pieces forming a frame, where the frame supports the motor;

guide rods supported in the frame for supporting in turn the slide in a direction parallel to the motion direction of the slide.

25. The data processing device according to claim 15 further comprising two side platens;

a bridge piece connecting the two side platens and forming with the two side platens a frame, wherein the motor is supported at the frame;

a slide;

guide rods supported in the frame guiding the slide in a direction parallel to the bridge piece;

a holder attached to the slide and disposed springingly adjustable in a direction perpendicular to the surface of an information carrier in order to assure a nearly air-gap-free sliding of the read-write head on the information carrier surface;

a read-write head attached with the holder in the slide such that the attachment of the holder is free from play in a direction of motion parallel to the bridge.

26. The data processing device according to claim 22 further comprising a separable ball joint bearing or separable ball bearing serving as a fixed bearing support;

a slide having a drive connection free from play to the motor or, respectively, to the screw spindle based on the fixed bearing support;

a floating bearing formed on the motor side comprising essentially an axial spring supported against a shaft collar of the motor, wherein the axial spring is supported against a screw spindle collar for pressing the screw spindle continuously against the separable ball bearing or, respectively, against the motor casing without exerting forces against the motor support.

27. The data processing device according to claim 22 further comprising guide rods;

a slide slidingly supported on the guide rods;

a stud bolt mounted to the slide;

a fixture;

a spindle nut attached to the stud bolt holding fixture and forming a single part with the spindle nut;

a springing arm attaching the spindle nut holding fixture at the stud bolt;

a compression spring pressing an arm and the spindle nut together based on forces defined by the spring characteristic of the compression spring as well as by the length of the arm as well as based on the number of the pitches of the thread of the spindle nut with the first flanks of the thread of the spindle nut into the second flanks of the thread of the screw spindle and wherein the first flanks of the thread and the second flanks of the thread are trapezoidal threads and providing a positioning of the flanks of the threads against each other and wherein the spindle nut is formed from two halves connected to each other with screws.

28. The data processing device according to claim 27 further comprising a thread section on the spindle nut disposed only on a side toward the motor, wherein the thread engages only a lower circumferential region of the screw spindle.

29. The data processing device using a magnetic information carrier comprising a read-write head;

an information carrier disposed facing the read-write head;

a slide supporting the read-write head;

a drive connection attached to the slide;

a motor connected to the slide by the drive connection and driving the slide for generating a relative motion between the information carrier and the read-write head during processing, wherein the drive connection between the slide and the motor is a precision transmission in the direction of the slide motion and where the read-write head is retained in a precise position by spring forces in a direction of motion perpendicular to a surface of the information carrier;

a holder springingly supporting the read-write head on the slide and comprising at least two springing bearing supports disposed at a distance from each other and perpendicular to the directions of motion and directed in the axial directions of motion of the slide, wherein the holder is tiltably supported at the springing bearing supports in a plane, wherein the holder forms attachment eyes at extensions, wherein the attachment eyes are hung on bearing bushes such that no axial play is generated in the directions of motion;

bearing cups are pressed at a distance into the slide at an axial distance in the directions of motion and bearing pins are fixedly pressed into the middle bores of the bearing cups, wherein a guide cone is formed in a bearing cup base; a compression spring supported on the guide cone and resting at its opposite ends at a collar such that the read-write head follows each unevenness, each inclined position or the like, of the information carrier and without any action of restoring forces acting on the read-write head for providing continuously a stable position of the read-write head.

30. The data processing device according to claim 29 further comprising
a holder mounted to the slide and supporting the read-write head in a precise position and subject to a restoring spring disposed on the slide; said holder comprising
two spring supported bearing guides disposed at a distance from each other in the directions of motion of the slide, wherein the bearing guides are springing in a direction perpendicular to the directions of motion of the slide.

31. The data processing device according to claim 29 wherein the spring supported bearing guides are tiltably supporting the holder in a plane perpendicular to the information carrier surface at the spring supported bearing guides.

32. The data processing device according to claim 29 further comprising
a bearing bush guided on the bearing pins and wherein the compression spring is supported by the bearing bush.

* * * * *